(12) United States Patent
Chavali

(10) Patent No.: US 11,150,711 B2
(45) Date of Patent: Oct. 19, 2021

(54) POWER ADAPTER WITH PROTECTION CIRCUITRY

(71) Applicant: Western Digital Technologies, Inc., San Jose, CA (US)

(72) Inventor: Shyam Chavali, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 359 days.

(21) Appl. No.: 16/016,427

(22) Filed: Jun. 22, 2018

(65) Prior Publication Data

US 2019/0391627 A1 Dec. 26, 2019

(51) Int. Cl.
*G06F 1/26* (2006.01)
*G06F 13/42* (2006.01)
*H02H 1/00* (2006.01)
*H02H 3/20* (2006.01)
*H02J 7/00* (2006.01)

(52) U.S. Cl.
CPC .......... *G06F 1/266* (2013.01); *G06F 13/4282* (2013.01); *H02H 1/0007* (2013.01); *H02H 3/207* (2013.01); *G06F 2213/0042* (2013.01); *H02J 7/00* (2013.01)

(58) Field of Classification Search
CPC combination set(s) only.
See application file for complete search history.

(56) References Cited

U.S. PATENT DOCUMENTS 9,900,420 B2 2/2018 DeCamp
2017/0124016 A1 5/2017 Gerber et al.
2017/0293335 A1 10/2017 Dunstan et al.
(Continued)

FOREIGN PATENT DOCUMENTS

CN 105656162 A 6/2016
CN 106571667 A 4/2017
CN 207051889 U 5/2017

OTHER PUBLICATIONS

Cypress Semiconductor, "EX-PD CCGI: USB Type-C Port Controller With PD," Mar. 2017 (available at http://www.cypress.com/file/407136/download).
Nate ENOS et al., "A primer on USB Type-C and Power Delivery applications and requirements," Nov. 2016 (available at www.ti.com/lit/wp/slyy109/slyy109.pdf).
(Continued)

*Primary Examiner* — Rexford N Barnie
*Assistant Examiner* — Elim Ortiz
(74) *Attorney, Agent, or Firm* — Jacobsen IP Law; Krista S. Jacobsen

(57) ABSTRACT

Devices and methods for selectively providing a voltage to an external device. A power adapter comprises a switch between an input voltage line and an output voltage line, a voltage generator configured to produce an output test voltage for delivery to the external device via a test voltage path, a return voltage path for receiving a return voltage from the external device, and a comparator coupled to the return voltage path and configured to control the switch. The switch completes a path between the input voltage line and the output voltage line only if the return voltage matches the reference voltage. The external device comprises an interface for connection to the power adapter and a voltage generator configured to receive the output test voltage from the power adapter and, using the output test voltage, produce and provide the return voltage to the power adapter over the interface.

29 Claims, 5 Drawing Sheets

(56) References Cited

U.S. PATENT DOCUMENTS

2017/0331270 A1\* 11/2017 Mattos ................. H02H 1/0007
2019/0278731 A1\* 9/2019 Mattos ................ G06F 13/4081

OTHER PUBLICATIONS

Richtek, "Introduction to Richtek USB Type-C Power Delivery Solutions," 2014 (available at http://www.richtek.com/Design%20Support/Technical%20Document/AN056).

\* cited by examiner

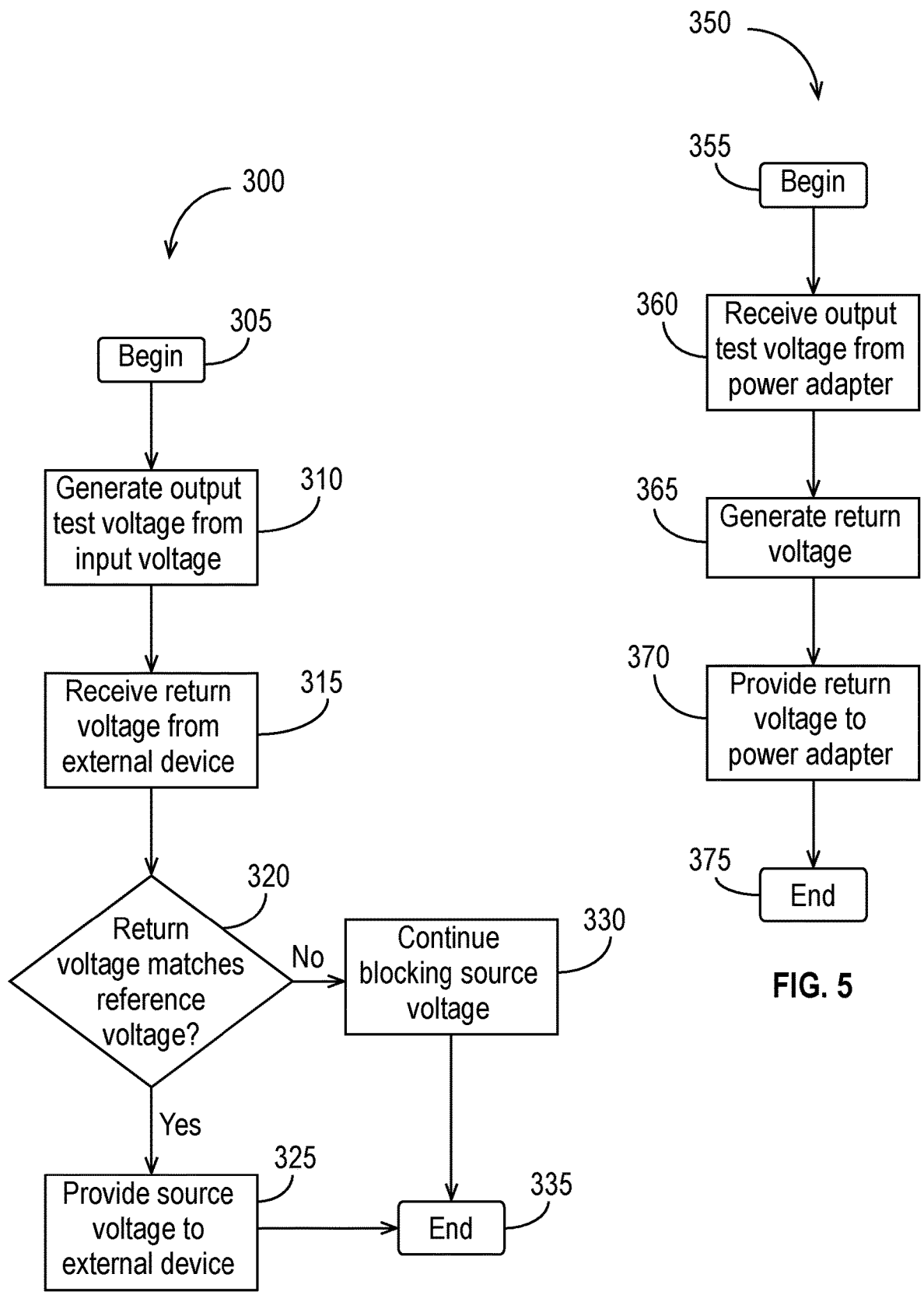

POWER ADAPTER WITH PROTECTION CIRCUITRY

BACKGROUND

A power adapter is a type of external power supply that is used with an electrical device that requires power but does not contain internal components to derive the required voltage and power from the general-purpose alternating-current (AC) electric power supply (i.e., mains power). Power adapters may be used with electrical devices that have no other source of power. They may also be used with battery-powered equipment, where the power supply, when plugged in, may be able to charge the battery in addition to powering the electrical device.

The use of power adapters offers several advantages. For example, power adapters allow portability of electrical devices powered either by mains power or a battery without the need to include substantial power components in the electrical devices. In addition, power adapters eliminate the need to produce equipment for use only with a specified power source. Instead, the same electrical device can be powered from, for example, mains power or from a battery by using a different power adapter. Power adapters can also increase safety because the power adapter transforms the 120 or 240 V mains power to a lower voltage. The electrical device handled by the user is then powered by this lower, safer voltage.

The Universal Serial Bus (USB) connector and the voltage it provides are commonly used in low-power AC adapters for portable devices (e.g., mobile phones, audio devices (e.g., MP3 players, speakers, etc.), tablets, electric fans, lamps, alarms, coffee warmers, battery chargers, toys, etc.). USB allows users to transfer data as well as charge their devices through the same interface, and plug-in adapters equipped with USB receptacles are widely available to convert 120 VAC or 240 VAC power (or 12 VDC power, e.g., from a car battery) to 5 VDC USB power.

Basic Type-C USB provides power up to a maximum of 15 W, with limits of 5 VDC at 3 A. By adding Power Delivery (PD) functionality, which allows connected devices to negotiate for the power they require, Type-C USB can provide up to 100 W, with limits of 20 VDC and 5 A.

Although USB PD provides for substantial flexibility by enabling powering and/or charging of electrical devices with widely varying power requirements, a drawback of USB PD is the complexity associated with the power negotiation procedure, which can increase the cost of both electrical devices and power adapters implementing Type-C USB PD.

SUMMARY

This summary represents non-limiting embodiments of the disclosure.

Disclosed herein are power adapters with protection circuitry and methods of using such power adapters. The disclosed power adapters and methods protect connected external devices from damage that could result when a power adapter that does not implement a power negotiation protocol is connected to an external device that either expects to perform a power negotiation protocol or requires a fixed power level that differs from that provided by the power adapter. The disclosed power adapters provide protection circuitry that blocks the source voltage of the power adapter unless and until the connected external device is verified to be the expected external device. Only after the external device has been verified does the power adapter provide the source voltage to the external device. The disclosed power adapters and methods are particularly well-suited for use in environments in which damage to a connected device could occur when that device is connected to an adapter that would otherwise provide too much power to the device.

In some embodiments, a power adapter for selectively providing a source voltage to an external device comprises a switch, a voltage generator, and a comparator. The switch is connected to an input voltage line at an input voltage and disposed between the input voltage line and an output voltage line. The voltage generator is coupled to the input voltage line and configured to produce an output test voltage for delivery to the external device via a test voltage path. The comparator is coupled to a reference voltage line and a return voltage path over which the power adapter receives a return voltage from the external device. The comparator is configured to control the switch such that when the return voltage matches the reference voltage, the switch completes a path between the input voltage line and the output voltage line, and when the return voltage does not match the reference voltage, the switch does not complete the path between the input voltage line and the output voltage line.

In some embodiments, the switch comprises a field-effect transistor (FET), and an output of the comparator is coupled to a gate of the FET. In some embodiments, the switch comprises a digital switch, and an output of the comparator is coupled to the digital switch. In some embodiments, the switch is configured to remain in an open state unless the return voltage matches the reference voltage.

In some embodiments, the comparator comprises a microcontroller and an analog-to-digital converter. In some embodiments, the comparator comprises an operational amplifier having a first input, a second input, and an output, wherein the first input is coupled to the reference voltage line, the second input is coupled to the return voltage path, and the output is coupled to the switch. In some such embodiments, the switch comprises a FET, and the output of the comparator is coupled to a gate of the FET.

In some embodiments, the comparator is configured to detect whether the return voltage is within a range characterized by a lower voltage limit and an upper voltage limit, wherein the return voltage matches the reference voltage if the return voltage is within the range. In some such embodiments, the comparator comprises a first operational amplifier having a first input, a second input, and a first output, a second operational amplifier having a third input, a fourth input, and a second output, and a NAND gate having a fifth input, a sixth input, and a third output, wherein a voltage at the first input is at the upper limit, a voltage at the third input is at the lower limit, the second and fourth inputs are coupled to the return voltage path, the first and second outputs are coupled to the fifth and sixth inputs, and the third output is coupled to the switch. In some such embodiments, the switch comprises a FET, and the third output is coupled to a gate of the FET.

In some embodiments, the voltage generator comprises a resistor network, a voltage divider, or a voltage regulator.

In some embodiments, the input voltage is equal to the source voltage.

In some embodiments, the test voltage path comprises a first sideband use (SBU) pin of a Type-C universal serial bus (USB) connector, and the return voltage path comprises a second SBU pin of the Type-C USB connector.

In some embodiments, a system comprises a power adapter and an external device comprising a voltage generator configured to receive the output test voltage, and, using the output test voltage, produce the return voltage. In some such embodiments, the voltage generator in the external device comprises a resistor network, a voltage divider, or a voltage regulator. In some embodiments, the external device further comprises circuitry configured to implement a power negotiation protocol, such as a universal serial bus (USB) power delivery protocol.

In some embodiments, a method comprises, in a power adapter, generating an output test voltage from an input voltage, the output test voltage for delivery to an external device; the power adapter receiving a return voltage from the external device; and the power adapter providing the source voltage to the external device only if the return voltage matches a reference voltage. In some embodiments, providing the source voltage to the external device comprises closing a switch between an input voltage line and a source voltage line in the adapter. In some embodiments, generating the output test voltage from the input voltage comprises dividing the input voltage. In some embodiments, receiving the return voltage from the external device comprises receiving the return voltage over a SBU pin of a Type-C USB connector.

In some embodiments, the power adapter providing the source voltage to the external device if the return voltage matches the reference voltage comprises determining whether the return voltage is within a specified range, and providing the source voltage to the external device if the return voltage is within the specified range.

In some embodiments, the method further comprises the power adapter providing the output test voltage to the external device, and the external device generating the return voltage using the output test voltage and providing the return voltage to the power adapter. In some embodiments, generating the return voltage from the output test voltage comprises dividing the output test voltage. In some embodiments, providing the output test voltage to the external device comprises providing the output test voltage over a first SBU pin of a Type-C USB connector, and providing the return voltage to the power adapter comprises providing the return voltage over a second SBU pin of the Type-C USB connector.

BRIEF DESCRIPTION OF THE DRAWINGS

Objects, features, and advantages of the disclosure will be readily apparent from the following description of certain embodiments taken in conjunction with the accompanying drawings in which:

FIG. 4 is a flowchart of a method performed by a power adapter in accordance with some embodiments.

FIG. 5 is a flowchart of a method performed by an external device in accordance with some embodiments.

DETAILED DESCRIPTION

Figure 1:
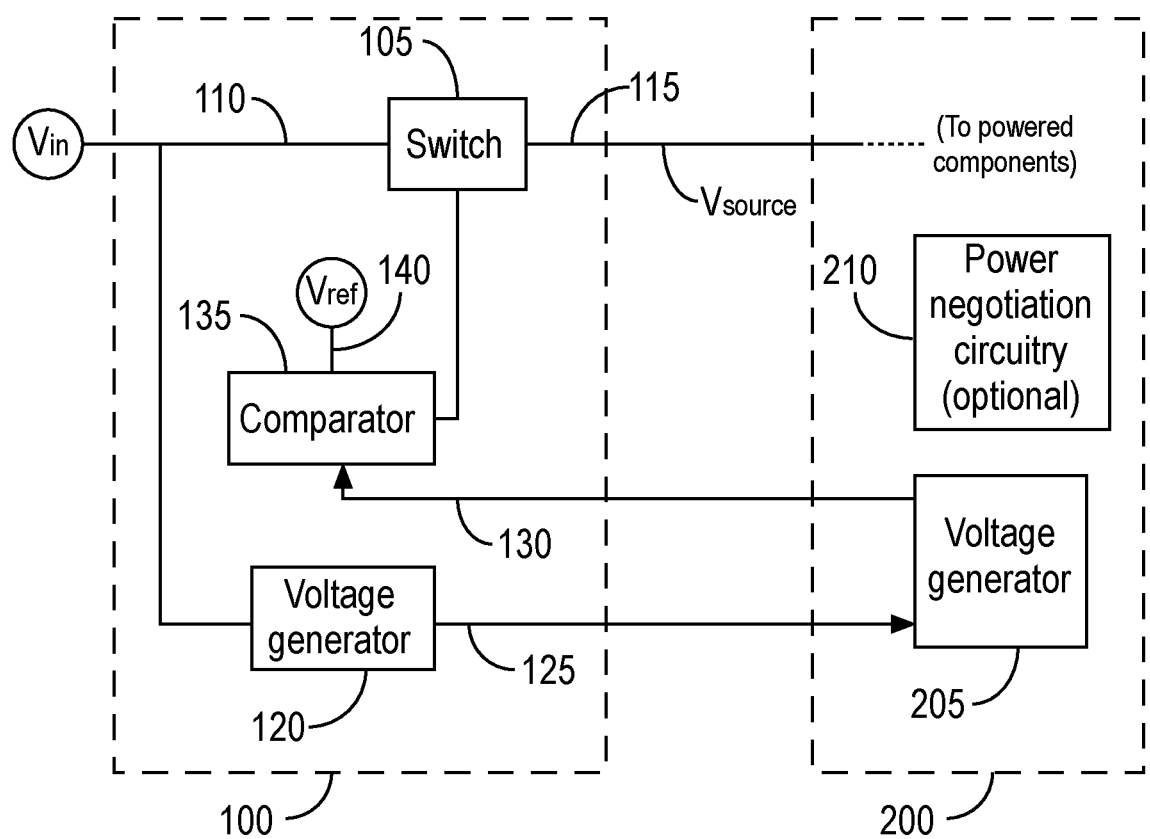
FIG. 1 illustrates a power adapter and an external device in accordance with some embodiments.

In this document, the term "external device" refers to any type of electrical device that may be connected to a power adapter. The term "power adapter" refers to any type of external power supply that is used with an external device that requires power but does not contain all (or any) internal components to derive the required voltage and power from mains power. Other common terms for power adapters include, but are not limited to, plug pack, plug-in adapter, adapter block, line power adapter, wall wart, power brick, AC adapter, charger, recharger, and battery charger.

Power negotiation functionality, of which USB PD is one example, can be useful when a manufacturer wishes to produce a universal power adapter that can provide power to any external device, or when a manufacturer wishes to provide an external device that can be powered by a variety of power adapters. Although power negotiation is useful in some circumstances, providing power negotiation functionality adds complexity to the power adapter and the external device, which can increase their design and manufacturing costs.

In some circumstances, the costs associated with power negotiation functionality may outweigh the benefit of power negotiation. For example, some external devices are provided to users along with a power adapter that allows users to charge those external devices. In cases in which the power adapter is packaged and provided along with the external device for which it is intended, the manufacturer may decide to provide a power adapter designed specifically for that external device, thereby avoiding the need to implement of any power negotiation protocol. In other words, the manufacturer can provide a power adapter that is customized for, and intended only for use with, the external device.

Furthermore, for convenience, a manufacturer that provides a power adapter with an external device may choose to use a standard or well-known connector type, such as USB Type-C, to connect the power adapter to the external device. The power adapter may, therefore, look to a user like a power adapter that the consumer expects, based on experience with similar-looking power adapters, to perform like a power adapter that implements a power negotiation function. As a consequence, not appreciating that the power adapter provided with a first external device has a different (and unexpected) functionality, a user could connect the power adapter to a second external device with a different (e.g., lower) power requirement, which could result in damage to the second external device.

Disclosed herein are power adapters and associated methods that protect connected external devices from damage that could result when a power adapter that does not implement a power negotiation protocol is connected to an external device that either expects to perform a power negotiation protocol or requires a fixed power level that differs from that provided by the power adapter. The disclosed power adapters provide protection circuitry that blocks the source voltage of the power adapter unless and until the connected external device is verified to be the expected external device. Only after the external device has been verified does the power adapter provide the source voltage to the external device.

FIG. 1 illustrates a power adapter 100 and a connected external device 200 in accordance with some embodiments. An input voltage line 110 is connected to an input voltage source, which provides an input voltage ($V_{in}$). The power adapter 100 selectively provides a source voltage ($V_{source}$) to the external device 200 over an output voltage line 115 only if a return voltage received from the external device 200 over a return voltage path 130 matches a reference voltage ($V_{ref}$). In some embodiments, the input voltage is equal to the source voltage.

The power adapter 100 comprises a switch 105, a comparator 135, and a voltage generator 120. As illustrated in FIG. 1, the voltage generator 120 is coupled to the input voltage line 110. The voltage generator 120 produces and provides a specified, known output test voltage to the external device 200 over a test voltage path 125. For example, the voltage generator 120 may divide the input voltage on the input voltage line 110 to produce the output test voltage. The output test voltage may have a value selected to reduce the likelihood of damage to an unintended external device. For example, the output test voltage may be set to a value of −1.2 V or another relatively low value.

The external device 200 also comprises a voltage generator 205. The voltage generator 205 receives the output test voltage from the power adapter 100 and, based on the output test voltage, produces a return voltage that is returned to the power adapter 100 via the return voltage path 130.

The comparator 135 comprises two inputs and one output. One of the two inputs is the return voltage from the external device 200. The other of the two inputs is a reference voltage ($V_{ref}$), provided to the comparator 135 via a reference voltage path 140. The output of the comparator 135 is coupled to the switch 105. The switch 105 is coupled to the input voltage line 110 and to the output voltage line 115. Depending on the state of the switch 105, which is controlled by the output of the comparator 135, the switch 105 either completes the path between the input voltage line 110 and the output voltage line 115, or it does not complete the path.

In operation, the comparator 135 output controls the state of the switch 105 so that (a) when the return voltage received from the external device 200 matches the reference voltage, the switch 105 completes the path between the input voltage line 110 and the output voltage line 115, and (b) when the return voltage received from the external device 200 does not match the reference voltage, the switch 105 does not complete the path between the input voltage line 110 and the output voltage line 115. Thus, in operation, the power adapter 100 provides the source voltage to the external device 200 only if the comparator 135 determines that the return voltage received from the external device 200, which the voltage generator 205 derives from the output test voltage, matches the reference voltage. As used in this context, the term "matches" means that the return voltage is within a tolerance of the reference voltage. Thus, the return voltage need not be identical to the reference voltage to match the reference voltage. As explained below in the discussion of FIG. 3, in some embodiments, the return voltage matches the reference voltage if the return voltage is within a specified voltage range.

To reduce the likelihood that an unexpected external device (i.e., an external device without the voltage generator 205) generates a voltage on the return path 130 that matches the reference voltage, the values of the output test voltage and the reference voltage (and, therefore, the expected return voltage) may be set to unusual values that an unexpected external device would be unlikely or unable to return under typical conditions. Furthermore, the output test voltage may be set to a safe level that is unlikely to damage an unexpected connected external device. For example, the voltage generator 120 in the power adapter 100 may be configured to provide an output test voltage of −1.2 V on the output test voltage path, and the voltage generator 205 in the external device 200 may be configured to return a return voltage of −0.85 V. The reference voltage in the power adapter 100 would then be set to 0.85 V. Unless an unexpected external device happens to generate −0.85 V on the return path 130, the switch 105 in the power adapter 100 will not complete the path between the input voltage line 110 and the output voltage line 115. Thus, the selection of unusual values for the output test voltage and the reference voltage will, in most circumstances, prevent the power adapter 100 from providing the source voltage to an unexpected external device.

The comparator 135 may comprise any suitable circuit or device, active or passive, analog or digital, that can be disposed as shown in FIG. 1 and that provides the described capability. For example, as described in more detail below in the context of FIGS. 2 and 3, the comparator 135 may comprise at least one operational amplifier (e.g., a differential op-amp). As another example, the comparator 135 may comprise a microcontroller and an analog-to-digital converter. The comparator 135 may be, for example, a window comparator (i.e., a circuit or device that determines whether an input is between two reference threshold voltages).

The switch 105 may comprise any suitable circuit or device, active or passive, analog or digital, that can be disposed as shown in FIG. 1 and that provides the described capability. For example, the switch 105 may comprise a transistor (e.g., a field-effect transistor (FET), a bipolar junction transistor (BJT), etc.), an analog switch, a digital switch, a mechanical switch, a microprocessor with an analog-to-digital converter, etc. In some embodiments, the switch 105 is configured to remain in an open position unless and until the return voltage matches the reference voltage.

The voltage generators 120 (in the power adapter 100) and 205 (in the external device 200) may comprise any suitable circuit or device, active or passive, analog or digital, that can be disposed as shown in FIG. 1 and that provides the described capability. For example, the voltage generator 120, 205 may comprise a resistor network, a voltage divider (e.g., using passive components), or a voltage regulator (i.e., an electrical or electronic device that maintains a voltage within acceptable limits). The voltage generator 120, 205 may comprise any suitable component, including, for example, an active component, a passive component, a diode, a transformer, a servomechanism, a voltage regulator tube, a transistor, an op-amp, an integrated circuit, a vacuum tube, etc.

In some embodiments in which the power adapter 100 comprises a Type-C USB interface and uses a Type-C USB connector, two sideband use (SBU) pins of the Type-C USB connector are used to convey the output test voltage to the external device 200 and receive the return voltage from the external device 200. For example, in some embodiments, the test voltage path 125 comprises a first SBU pin of a Type-C USB connector, and the return voltage path 130 comprises a second SBU pin of the Type-C USB connector. SBU signals are used only in a particular mode for alternate uses such as display ports. In many applications, SBU signals are not used. Therefore, the SBU pins may be available to pass the output test voltage to the external device 200 and to receive the return voltage from the external device 200.

As shown in FIG. 1, the external device 200 may optionally include power negotiation circuitry 210. For example, the power negotiation circuitry 210 may implement the Type-C USB PD protocol or any other power negotiation protocol. The inclusion of power negotiation circuitry 210 in the external device 200 may be desirable to allow the external device 200 to be powered by a power adapter that also includes power negotiation circuitry. In other words, the inclusion of power negotiation circuitry 210 in the external device 200 may enable the external device 200 to be powered by a wider variety of power adapters, and not just the power adapter 100 described herein.

Figure 2:
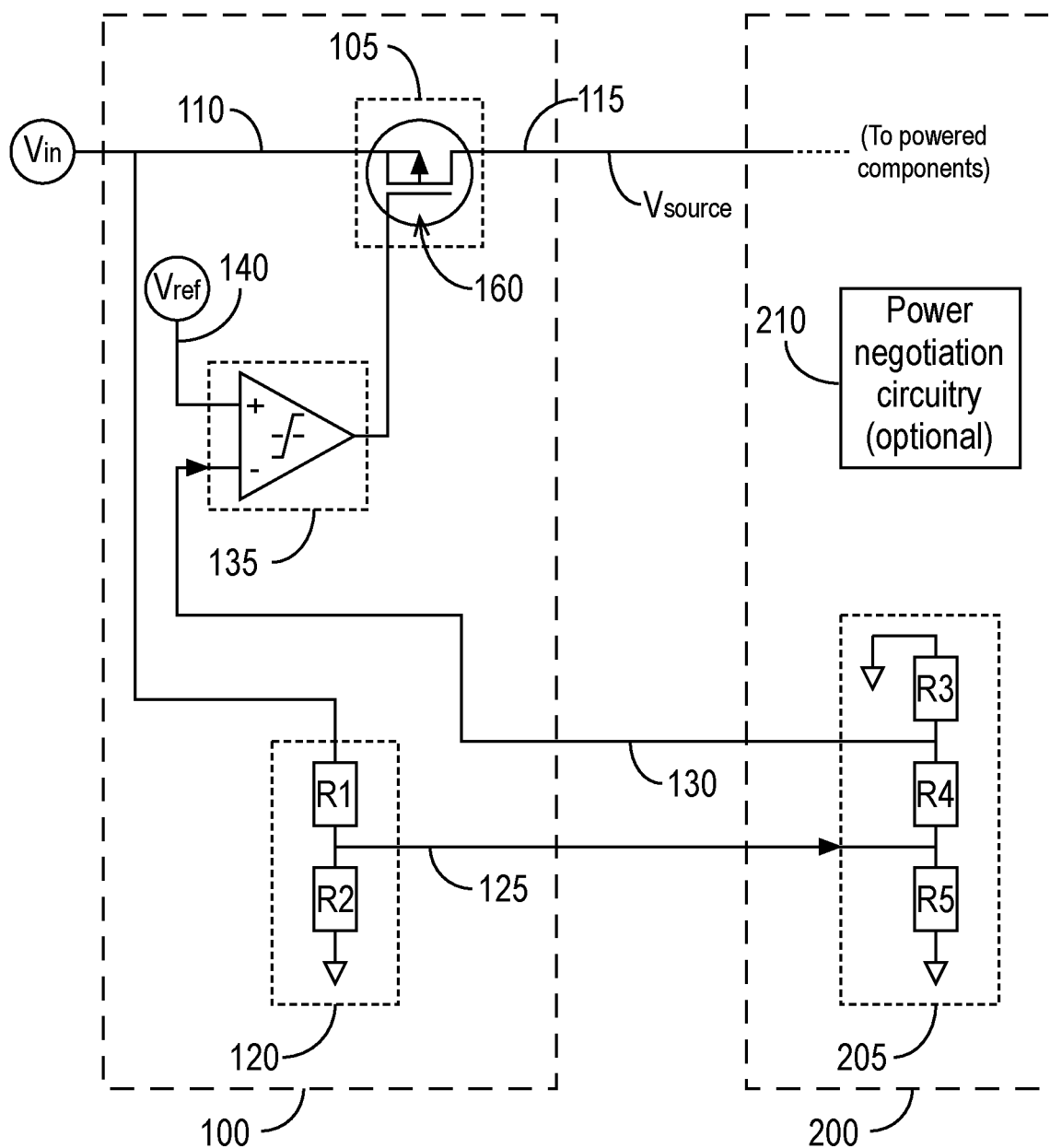
FIG. 2 illustrates a power adapter and an external device in accordance with some embodiments.

FIG. 2 illustrates a power adapter 100 and a connected external device 200 in accordance with some embodiments.

In the example shown in FIG. 2, the voltage generator 120 comprises a voltage divider with two resistive elements, R1 and R2. Similarly, the voltage generator 205 comprises a voltage divider. In the example of FIG. 2, the voltage generator 205 comprises a three-level resistor divider network with resistive elements R3, R4, and R5. The comparator 135 comprises an op-amp 150 with two inputs and an output. One of the inputs to the op-amp 150 is the reference voltage from the reference voltage line 140, and the other is the return voltage on the return voltage path 130. The switch 105 comprises a FET 160 (e.g., a p-channel FET). The gate of the FET 160 is coupled to the output of the op-amp 150. The source of the FET 160 is coupled to the input voltage line 110, and the drain of the FET 160 is coupled to the output voltage line 115.

Figure 3:
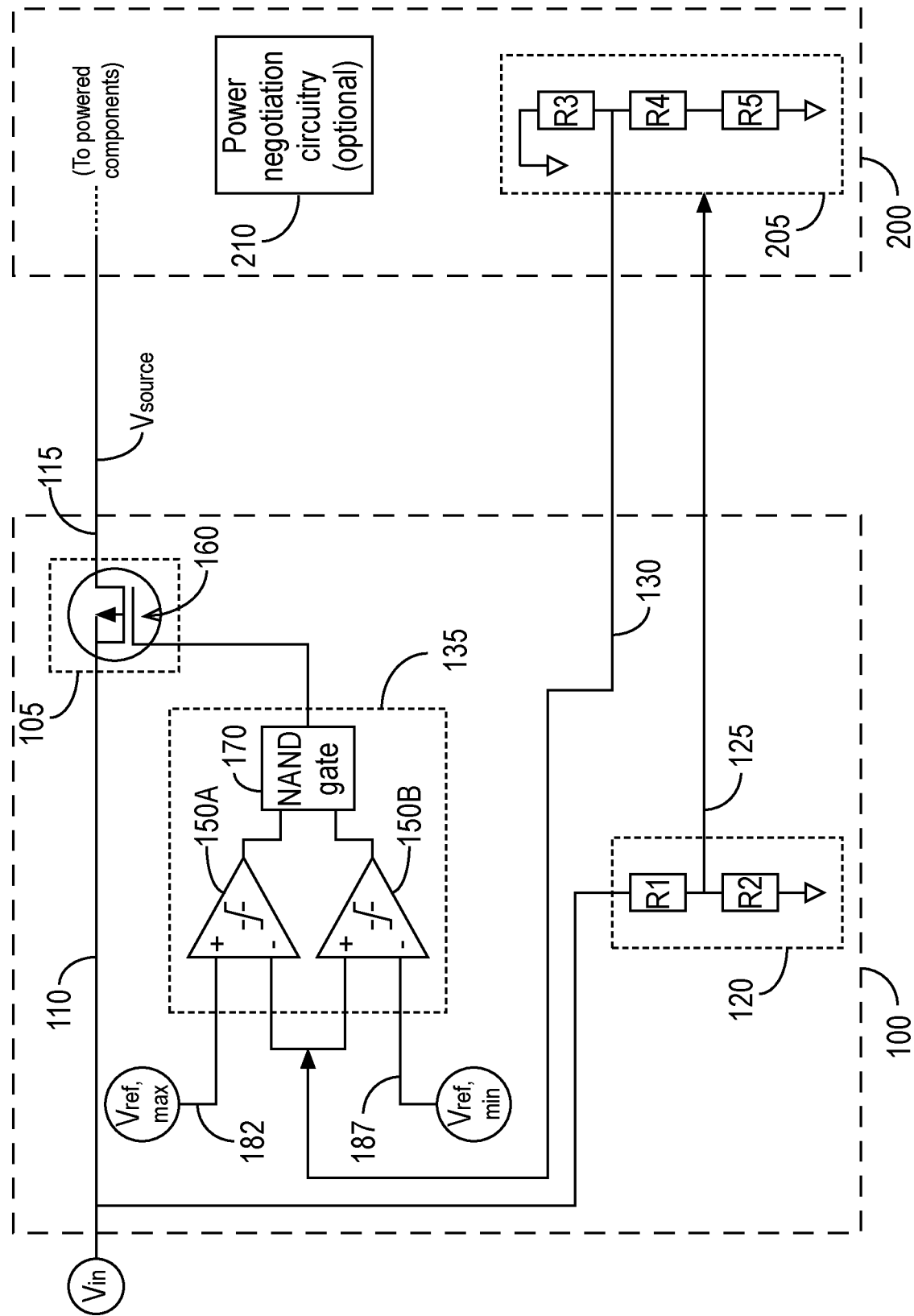
FIG. 3 illustrates a power adapter and an external device in accordance with some embodiments.

FIG. 3 illustrates a power adapter 100 and a connected external device 200 in accordance with some embodiments. The voltage generators 120 and 205 and the switch 105 of FIG. 3 are as shown and described above in the context of FIG. 2. In the example of FIG. 3, the comparator 135 is configured to detect whether the return voltage from the external device 200 is within a specified range characterized by a lower voltage limit ($V_{ref,min}$) and an upper voltage limit ($V_{ref,max}$). The comparator 135 of FIG. 3 comprises two op-amps 150A, 150B, each with two inputs and an output, and a NAND gate 170 with two inputs and one output. The positive input of the op-amp 150A is coupled to a maximum reference voltage path 182 (at a voltage level of $V_{ref,max}$), and the negative input of the op-amp 150A is coupled to the return voltage path 130. The output of the op-amp 150A will be a positive value (e.g., +1) if the return voltage is less than $V_{ref,max}$. The positive input of the second op-amp 150B is coupled to the return voltage path 130, and the negative input of the second op-amp 150B is coupled to a minimum reference voltage path 187 (at a voltage level of $V_{ref,min}$). The output of the op-amp 150B will be a positive value (e.g., +1) if the return voltage is greater than $V_{ref,min}$. The outputs of the first and second op-amps 150A, 150B are coupled to the NAND gate 170. As will be appreciated by skilled artisans, the comparator 135 and switch 105 shown in FIG. 3 will cause the path between the input voltage line 110 and the output voltage line 115 to be completed only if the return voltage is within the specified voltage range, namely, between the upper voltage limit ($V_{ref,max}$) and the lower voltage limit ($V_{ref,min}$).

It is to be understood that FIG. 3 illustrates one example of a comparator 135 that can detect whether the return voltage is within a specified voltage range. There are many other ways to design a comparator 135 to detect whether the return voltage is within a specified range, all of which are within the scope of this disclosure.

It is also to be understood that although FIGS. 1-3 illustrate the input voltage source as being external to the power adapter 100, the input voltage source may alternatively be provided in the power adapter 100 (e.g., the power adapter 100 may include a battery, such as a rechargeable battery, or another internal power source). In addition, although FIGS. 1-3 illustrate the reference voltage source as being internal to the power adapter 100, the reference voltage source may alternatively be external to the power adapter 100. Furthermore, although FIG. 1 illustrates the input voltage source and reference voltage source decoupled from each other, the reference voltage may be derived from the input voltage. Moreover, although FIGS. 1-3 and the descriptions thereof distinguish between the input and source voltages, it is to be understood that the value of the source voltage (i.e., the voltage provided to the external device 200) may be the same as the value of the input voltage.

FIG. 4 is a flowchart illustrating a method 300 performed by a power adapter 100 in accordance with some embodiments. When the external device 200 is initially connected to the power adapter 100, the power adapter 100 prevents the source voltage from being delivered to the external device 200, pending verification that the external device 200 is an expected external device. Only after verifying that the external device 200 is an expected external device does the power adapter 100 provide the source voltage to the external device 200.

At 305, the method 300 begins. At 310, the power adapter 100 generates an output test voltage from an input voltage. For example, the power adapter 100 may generate the output test voltage by dividing the input voltage (e.g., using a voltage divider, such as a resistor network). As another example, the power adapter 100 may generate the output test voltage using a voltage regulator.

At 315, the power adapter 100 receives a return voltage from a connected external device 200. For example, when the power adapter 100 and the external device 200 use Type-C USB connectors, the power adapter 100 may receive the return voltage from the external device 200 over the sideband use (SBU) pin of a Type-C USB connector.

At 320, the power adapter 100 determines whether the return voltage matches a reference voltage. For example, the power adapter 100 may determine whether the return voltage matches the reference voltage by determining whether the return voltage lies within a specified range (e.g., as described above in the context of the comparator 135 of FIG. 3).

If the return voltage matches the reference voltage, at 325, the power adapter provides a source voltage to the connected external device 200. For example, the power adapter 100 may provide the source voltage to the external device 200 by closing a switch 105 in the power adapter 100.

If the return voltage does not match the reference voltage, at 330, the power adapter 100 continues blocking the source voltage and does not provide the source voltage to the external device 200. For example, the power adapter 100 may prevent the source voltage from being delivered to the external device 200 by opening a switch 105 or by not closing the switch 105. At 335, the method 300 ends.

FIG. 5 is a flowchart illustrating a method 350 performed by an external device 200 in accordance with some embodiments. At 355, the method 350 begins. At 360, the external device 200 receives the output test voltage from the power adapter 100. For example, when the power adapter 100 and the external device 200 use Type-C USB connectors, the external device 200 may receive the output test voltage from the power adapter 100 over a first SBU pin of a Type-C USB connector.

At 365, the external device 200 generates the return voltage. For example, the external device 200 may generate the return voltage by dividing the output test voltage (e.g., using a network or resistive elements as illustrated in FIGS. 2 and 3).

At 370, the external device 200 provides the return voltage to the power adapter 100. For example, when the power adapter 100 and the external device 200 use Type-C USB connectors, the external device may provide the return voltage to the power adapter 100 over a second SBU pin of a Type-C USB connector. At 375, the method ends.

Figure 6:
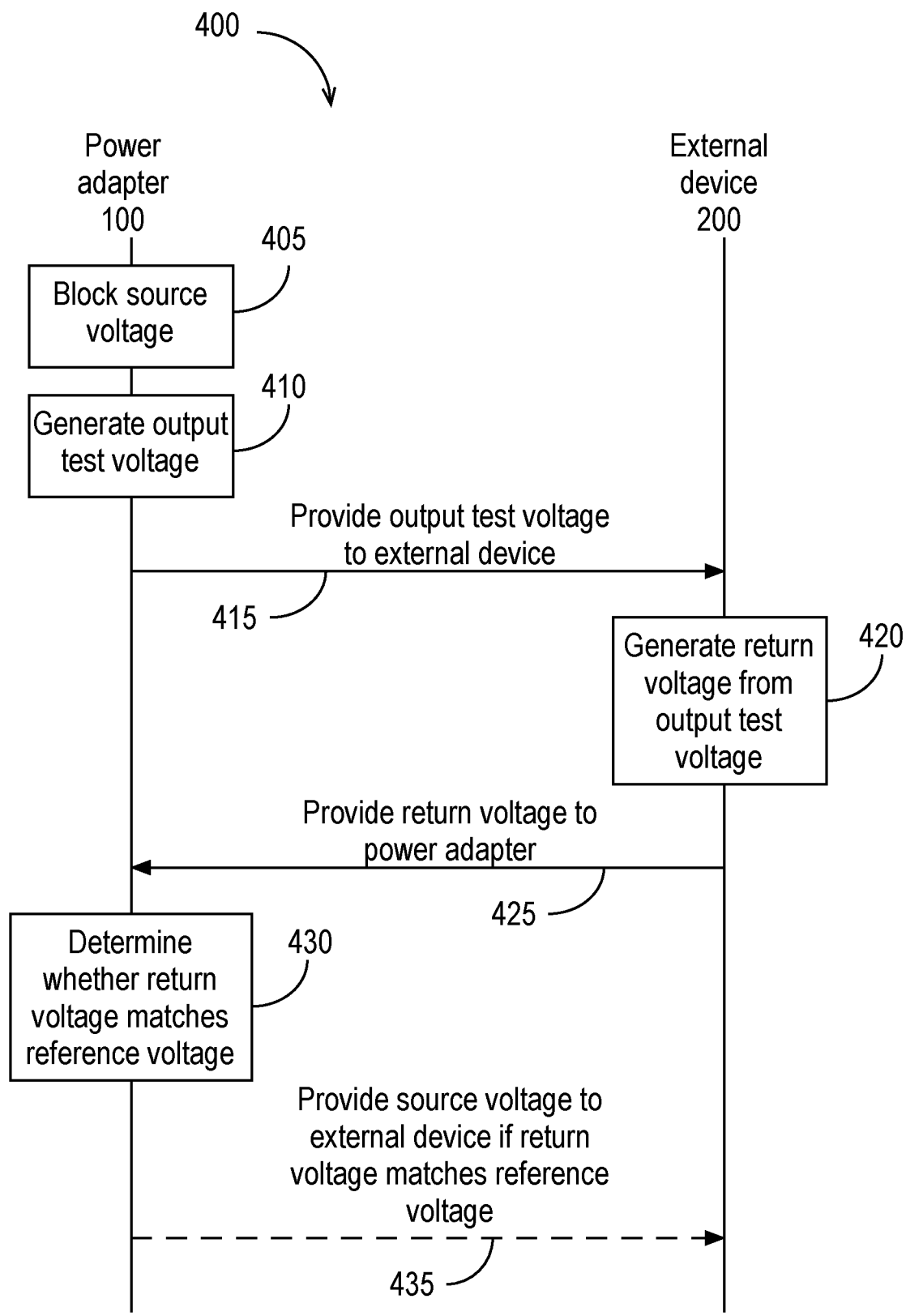
FIG. 6 is a timing diagram illustrating a method in accordance with some embodiments.

FIG. 6 is a timing diagram illustrating a method 400 in accordance with some embodiments. Initially, at 405, the power adapter 100 blocks the source voltage to prevent the source voltage from being delivered to a connected external device 200 (e.g., by preventing a path between the input voltage line and the source voltage line from being completed, by opening a switch, by not closing a switch, etc.). At 410, the power adapter 100 generates the output test voltage (e.g., by dividing the input voltage using a voltage divider, which may be a network of resistive elements). At 415, the power adapter 100 provides the output test voltage to the connected external device 200 (e.g., over a first pin of a connector, such as a first SBU pin of a Type-C USB connector). At 420, the external device generates a return voltage from the output test voltage (e.g., by dividing the output test voltage using a voltage divider, which may be network of resistive elements). At 425, the external device 200 provides the return voltage to the power adapter 100 (e.g., over a second pin of a connector, such as a second SBU pin of a Type-C USB connector). At 430, the power adapter 100 determines whether the return voltage matches a reference voltage (e.g., by determining whether the return voltage is within a tolerance of a reference voltage, by determining whether the return voltage is within a specified voltage range, etc.). If the return voltage matches the reference voltage, at 435 the power adapter 100 provides the source voltage to the external device 200 (e.g., by completing the path between the input voltage line and the source voltage line, by closing a switch, etc.).

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., resistors) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used herein, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the description, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature (e.g., a layer of a media) with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "coupled" as used herein means connected directly or connected through one or more intervening components. Thus, "A is coupled to B" means that A and B are connected either directly or through one or more intervening components.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A power adapter for selectively providing a source voltage to an external device, the power adapter comprising:
   a switch coupled to an input voltage line and disposed between the input voltage line and an output voltage line, wherein the input voltage line is at an input voltage;
   a voltage generator coupled to the input voltage line and configured to produce an output test voltage for delivery to the external device via a test voltage path;
   a return voltage path for receiving a return voltage from the external device; and
   a comparator coupled to a reference voltage line and the return voltage path and configured to (a) directly compare the return voltage to a reference voltage provided over the reference voltage line, and (b) control the switch such that:
      when the return voltage matches the reference voltage, the switch completes a path between the input voltage line and the output voltage line, and
      when the return voltage does not match the reference voltage, the switch does not complete the path between the input voltage line and the output voltage line.

2. The power adapter recited in claim 1, wherein the switch comprises a field-effect transistor (FET), and an output of the comparator is coupled to a gate of the FET.

3. The power adapter recited in claim 1, wherein the switch comprises a digital switch, and an output of the comparator is coupled to the digital switch.

4. The power adapter recited in claim 1, wherein the switch is configured to remain in an open state unless the return voltage matches the reference voltage.

5. The power adapter recited in claim 1, wherein the comparator comprises a microcontroller and an analog-to-digital converter.

6. The power adapter recited in claim 1, wherein the comparator comprises an operational amplifier having a first input, a second input, and an output, and wherein the first input is coupled to the reference voltage line, the second input is coupled to the return voltage path, and the output is coupled to the switch.

7. The power adapter recited in claim 6, wherein the switch comprises a field-effect transistor (FET), and the output is coupled to a gate of the FET.

8. The power adapter recited in claim 1, wherein the comparator is configured to directly compare the return voltage to the reference voltage provided over the reference voltage line by detecting whether the return voltage is within a range characterized by a non-zero lower voltage limit and a non-zero upper voltage limit, the reference voltage being between the non-zero lower voltage limit and the non-zero upper voltage limit, and wherein the return voltage matches the reference voltage if the return voltage is within the range.

9. The power adapter recited in claim 8, wherein the comparator comprises:
- a first operational amplifier having a first input, a second input, and a first output;
- a second operational amplifier having a third input, a fourth input, and a second output; and
- a NAND gate having a fifth input, a sixth input, and a third output, and wherein:
- a voltage at the first input is at the non-zero upper voltage limit,
- a voltage at the third input is at the non-zero lower voltage limit,
- the second and fourth inputs are coupled to the return voltage path,
- the first and second outputs are coupled to the fifth and sixth inputs, and
- the third output is coupled to the switch.

10. The power adapter recited in claim 9, wherein the switch comprises a field-effect transistor (FET), and the third output is coupled to a gate of the FET.

11. The power adapter recited in claim 1, wherein the voltage generator comprises a resistor network, a voltage divider, or a voltage regulator.

12. The power adapter recited in claim 1, wherein the input voltage is equal to the source voltage.

13. The power adapter recited in claim 1, wherein the test voltage path comprises a first sideband use (SBU) pin of a Type-C universal serial bus (USB) connector, and the return voltage path comprises a second SBU pin of the Type-C USB connector.

14. A system, comprising:
- the power adapter recited in claim 1, wherein the voltage generator is a first voltage generator; and
- the external device, wherein the external device comprises a second voltage generator configured to:
  - receive the output test voltage, and
  - using the output test voltage, produce the return voltage.

15. The system recited in claim 14, wherein the second voltage generator comprises a resistor network, a voltage divider, or a voltage regulator.

16. The system recited in claim 14, wherein the external device further comprises circuitry configured to implement a power negotiation protocol.

17. The system recited in claim 16, wherein the power negotiation protocol is a universal serial bus (USB) power delivery protocol.

18. An external device to be coupled to a power adapter for selectively providing a source voltage to the external device, the external device comprising:
- an interface for connection to the power adapter; and
- a voltage generator coupled to the interface, wherein the voltage generator is configured to:
  - receive an output test voltage from the power adapter over the interface,
  - using the output test voltage, produce a return voltage, and
  - provide the return voltage to the power adapter over the interface, wherein the power adapter comprises:
- a power-adapter voltage generator configured to produce the output test voltage for delivery to the external device;
- a return voltage path for receiving the return voltage from the external device; and
- a comparator coupled to a reference voltage line and the return voltage path and configured to (a) directly compare the return voltage to a reference voltage, and (b) close a switch in response to the return voltage matching the reference voltage, thereby providing the source voltage to the external device.

19. The external device recited in claim 18, wherein the voltage generator comprises a resistor network, a voltage divider, or a voltage regulator.

20. The external device recited in claim 18, wherein the external device further comprises circuitry configured to implement a power negotiation protocol.

21. The external device recited in claim 20, wherein the power negotiation protocol is a universal serial bus (USB) power delivery protocol.

22. A method of using a power adapter to selectively provide a source voltage to an external device, the method comprising:
- in the power adapter, generating an output test voltage from an input voltage, the output test voltage for delivery to the external device;
- the power adapter providing the output test voltage to the external device;
- after providing the output test voltage to the external device, the power adapter receiving a return voltage from the external device;
- the power adapter directly comparing the return voltage to a reference voltage;
- in response to the return voltage matching the reference voltage, the power adapter providing the source voltage to the external device; and
- in response to the return voltage not matching the reference voltage, the power adapter not providing the source voltage to the external device.

23. The method recited in claim 22, wherein providing the source voltage to the external device comprises closing a switch between an input voltage line and an output voltage line in the power adapter.

24. The method recited in claim 22, wherein generating the output test voltage from the input voltage comprises dividing the input voltage.

25. The method recited in claim 22, wherein receiving the return voltage from the external device comprises receiving the return voltage over a sideband use (SBU) pin of a Type-C universal serial bus (USB) connector.

26. The method recited in claim 22, wherein the power adapter providing the source voltage to the external device in response to the return voltage matching the reference voltage comprises:
- determining whether the return voltage is within a specified range characterized by a non-zero lower voltage limit and a non-zero upper voltage limit, wherein the reference voltage is within the specified range, and
- providing the source voltage to the external device if the return voltage is within the specified range.

27. The method recited in claim 22, further comprising:
in the external device, generating the return voltage using the output test voltage; and
the external device providing the return voltage to the power adapter.

28. The method recited in claim 27, wherein generating the return voltage from the output test voltage comprises dividing the output test voltage.

29. The method recited in claim 27, wherein providing the output test voltage to the external device comprises providing the output test voltage over a first sideband use (SBU) pin of a Type-C universal serial bus (USB) connector, and providing the return voltage to the power adapter comprises providing the return voltage over a second SBU pin of the Type-C USB connector.

\* \* \* \* \*